Oct. 29, 1957 W. J. SHAW 2,811,386
RETRACTABLE SUPPORTS FOR A REMOVABLE VEHICLE BODY
Filed Sept. 6, 1955 3 Sheets-Sheet 3
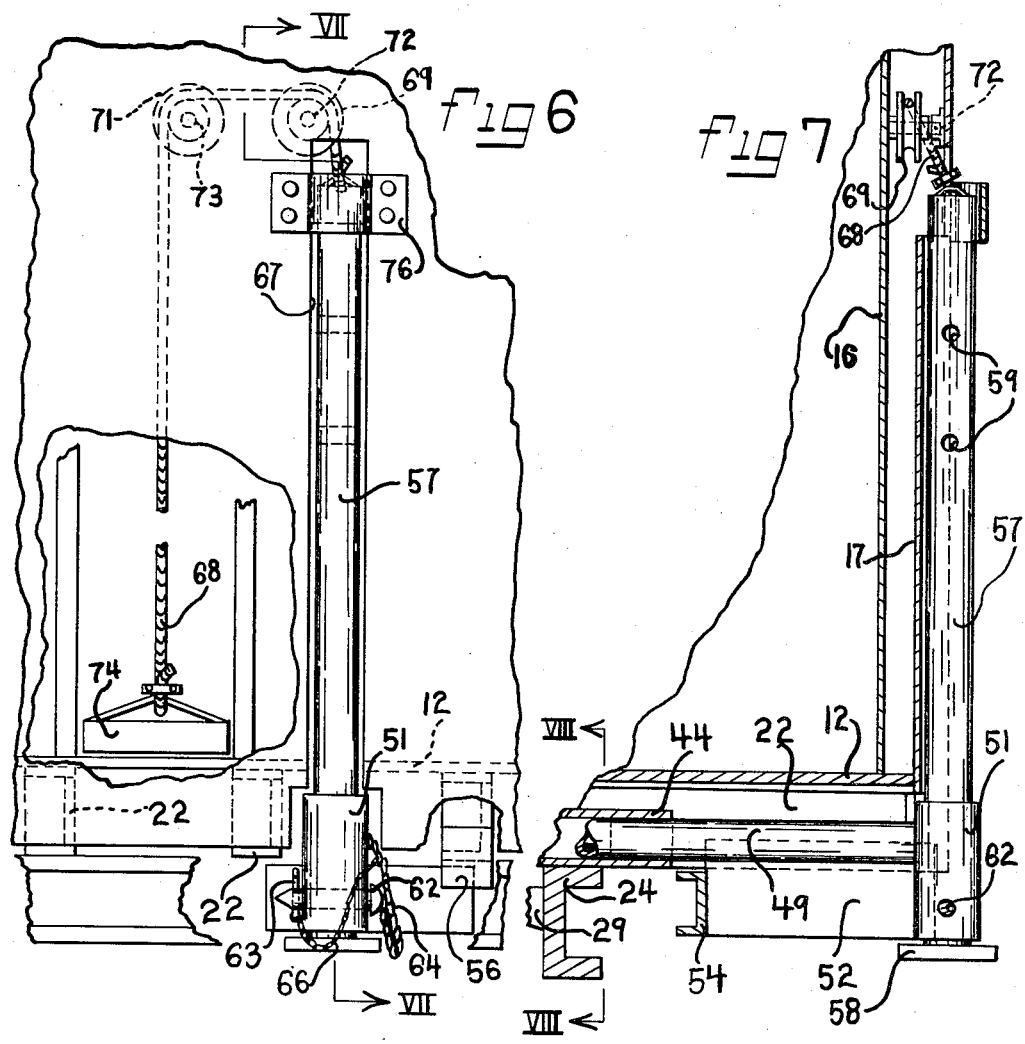
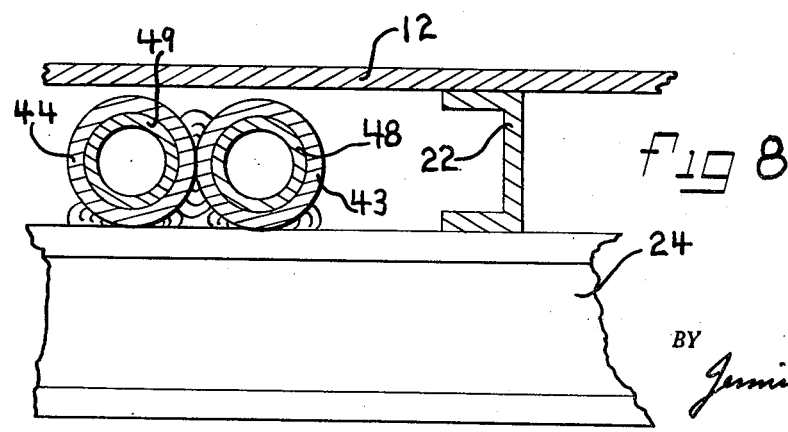
INVENTOR.
Willie J. Shaw
BY
Jennings & Carter
Attorneys

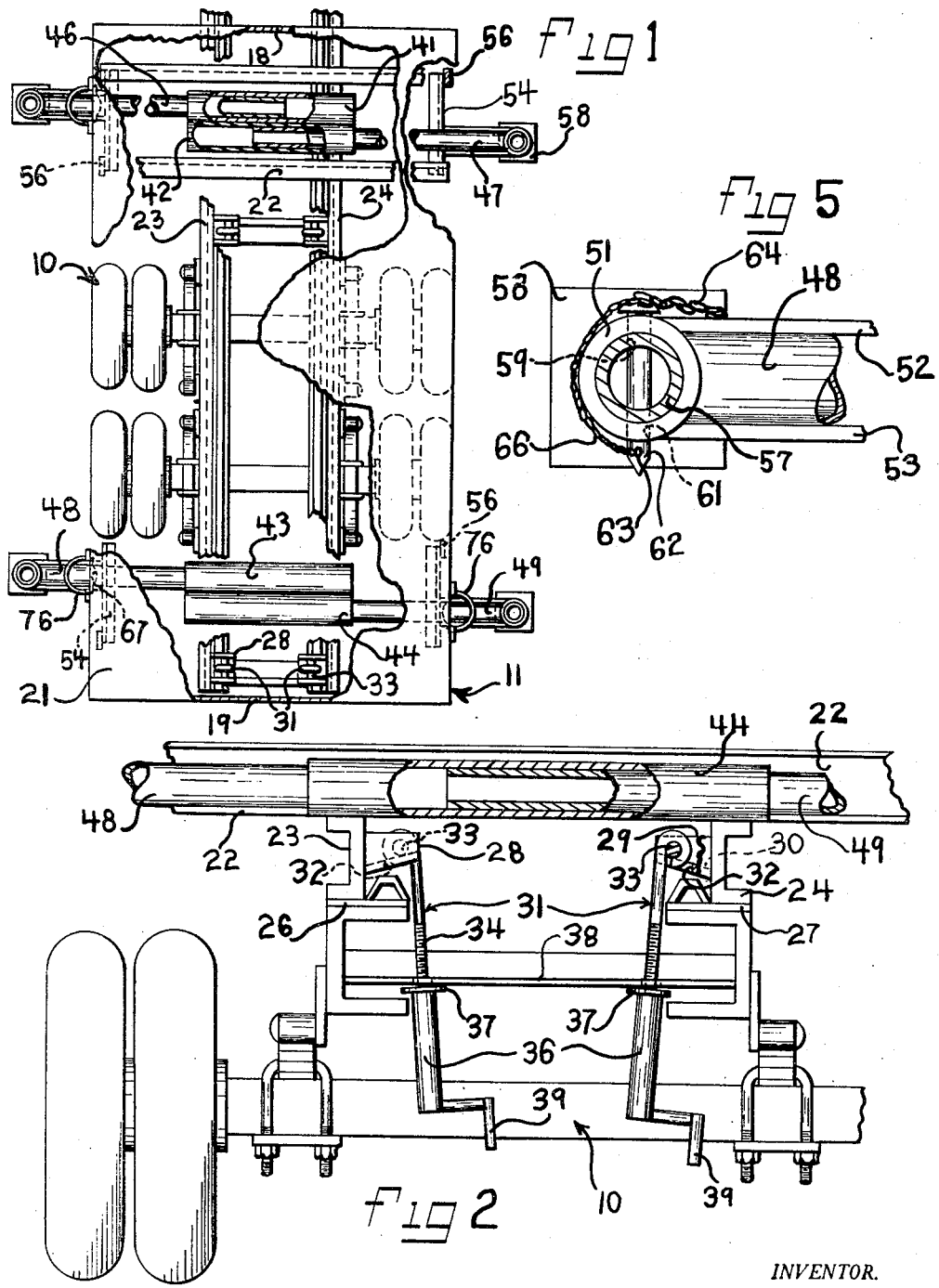

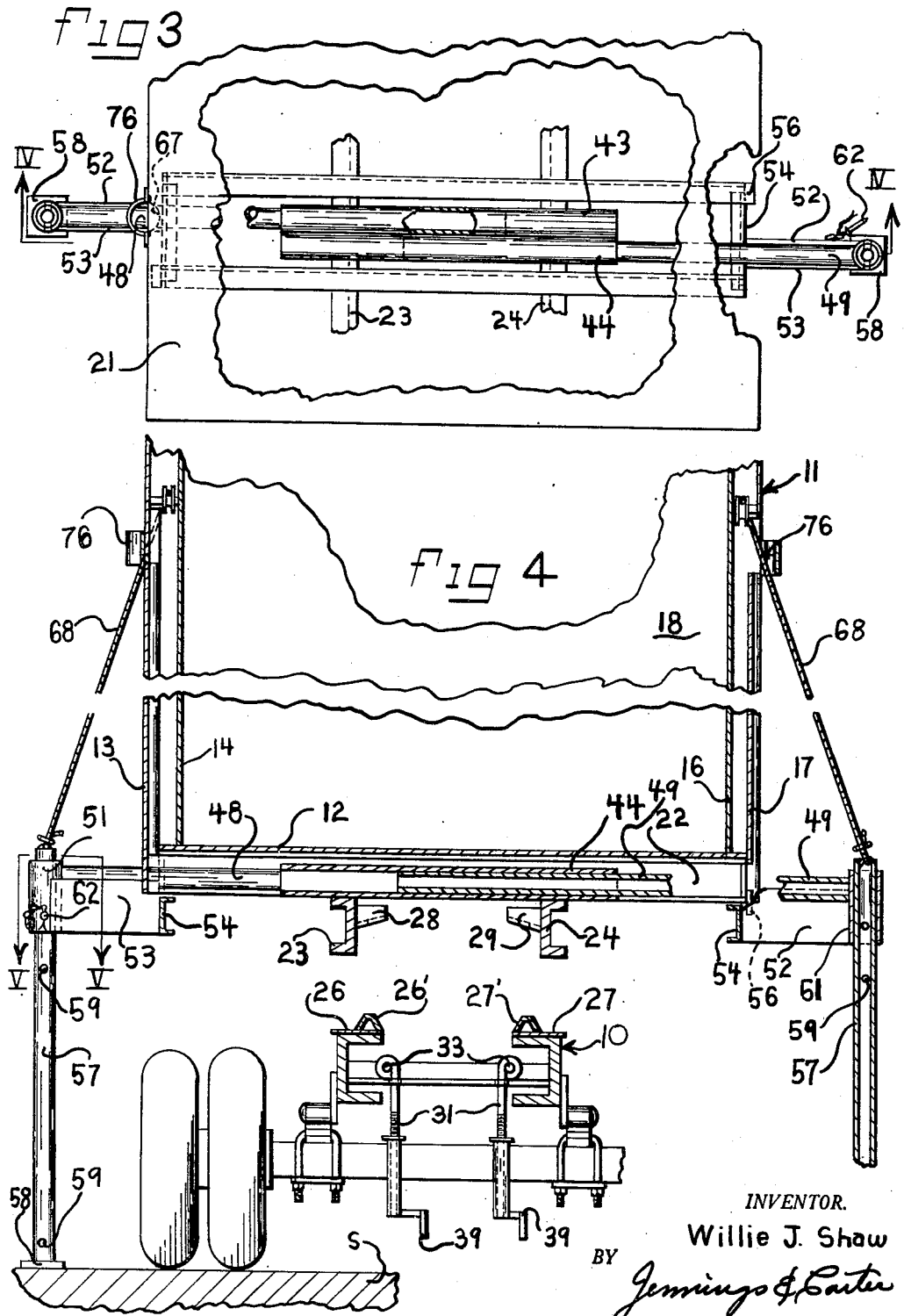

United States Patent Office 2,811,386
Patented Oct. 29, 1957

2,811,386

RETRACTABLE SUPPORTS FOR A REMOVABLE VEHICLE BODY

Willie J. Shaw, Birmingham, Ala., assignor to Moore-Handley Hardware Co., Inc., a corporation of Alabama Application September 6, 1955, Serial No. 532,616

11 Claims. (Cl. 296—28)

This invention relates to a support for a removable vehicle body and more particularly to legs for supporting the body adjacent each corner thereof in such a manner that the vehicle chassis may be driven under the body.

An object of my invention is to provide supports for a removable vehicle body which are positioned a substantial distance outwardly of the sides of the body and are adjustable laterally, whereby a vehicle chassis may be driven under the body without coming in contact with the supports for the body.

Another object of my invention is to provide supports for a removable vehicle body which are adjustable vertically whereby vehicle chassis of varying heights may be employed or by means of which the body may be supported in horizontal position on uneven ground.

A further object of my invention is to provide supports of the character designated which are counterbalanced whereby they may be readily raised or lowered with a minimum of effort, thereby reducing both the labor and time required to raise and lower the supports and also eliminating the dangers of injury to the operator which exists in previous supports which slide downwardly freely when released.

A still further object of my invention is to provide supports for a removable vehicle body which are simple of construction, economical of manufacture and which provide rigid supporting means for the body.

Heretofore in the art to which my invention relates, various means have been devised for supporting removable vehicle bodies, such as leg members hingedly connected to the bottom of the body and disposed to move inwardly against the bottom when not in use. There also have been used some vertically slidable legs. Some of such supporting means necessitates getting under the body to lower the supports, which is a difficult task due to the close clearance between the vehicle chassis and the bottom structure of the body. Also, with such supports, the vehicle chassis must be driven within close proximity to the supports, thus requiring a very skilled driver and consuming a substantial amount of time to position the chassis beneath the body. With the prior sliding type the legs are likely to drop onto the foot of the operator while being lowered, and, being of heavy pipe, are difficult to lift back into raised position.

Briefly, my improved means for supporting a removable vehicle body comprises horizontal guide members extending transversely beneath and secured to the bottom of the body with support members mounted for sliding movement relative to the guide members and projecting outwardly of the body adjacent the corners thereof. Leg members are mounted for vertical movement adjacent the outer ends of the support members and means is provided for detachably connecting the leg members to the support members at selected elevated positions whereby the leg members are locked in either raised, lowered, or intermediate positions. To facilitate raising and lowering the leg members and to make the apparatus safe, I provide means for counterbalancing the weight of the leg members. Preferably the counterbalance is in the form of a weight located in the walls of the body.

Apparatus illustrating features of my invention is shown in the accompanying drawings, forming a part of this application, in which:

Fig. 1 is a plan view, partly broken away and in section, showing the removable body mounted on a vehicle chassis;

Fig. 2 is an enlarged fragmental view, partly broken away and in section, showing the manner in which the support members are attached to the vehicle body and the means for attaching the body to the supporting chassis;

Fig. 3 is a fragmental plan view, partly broken away and in section, showing the rear end of the removable body having my improved supporting means associated therewith;

Fig. 4 is a sectional view taken generally along line IV—IV of Fig. 3;

Fig. 5 is an enlarged fragmental sectional view taken along line V—V of Fig. 4;

Fig. 6 is an enlarged fragmental, side elevational view partly broken away showing the supporting leg with the counterbalance means operatively connected thereto;

Fig. 7 is a sectional view taken generally along line VII—VII of Fig. 6; and,

Fig. 8 is an enlarged fragmental view taken along line VIII—VIII of Fig. 7.

Referring now to the drawings for a better understanding of my invention I show a vehicle chassis 10 which may be in the form of a trailer adapted to support a removable body indicated generally at 11. The removable body 11 is provided with a bottom wall or floor 12 and hollow side walls formed of spaced plates 13 and 14 at one side and 16 and 17 at the other side thereof. The body 11 is also provided with the usual front and rear walls 18 and 19, respectively and a top 21. Extending transversely beneath the floor 12 are the usual channel support members 22.

Secured to the undersurface of the transverse channels 22 and extending longitudinally beneath the body 11 are channel members 23 and 24. As shown in Figs. 1 and 4, the channel members 23 and 24 are positioned on opposite sides of the center of the body in position to rest on the upper surface of supporting plates 26 and 27, respectively mounted on the chassis 10. Inverted U-shape members 26' and 27' are secured to the plates 26 and 27 in position to lie inwardly of the channels 23 and 24 when the body is lowered onto the chassis, thereby assuring proper alignment of the body relative to the chassis and preventing lateral shifting of the body.

Mounted on the channels 23 and 24 and extending inwardly thereof are brackets 28 and 29 having sloping bottom walls 30 for receiving the upper ends of hold-down members indicated generally at 31. The hold-down members fit in slots 32 provided in the bottom walls 30. Secured to the upper ends of the hold-down members are short rod-like members 33 which engage the upper surface of the bottom walls 30 as shown. The lower ends of the hold-down members 31 are threaded as at 34 for engaging an internally threaded member 36 having an annular flange 37 at the upper end thereof disposed to engage beneath a horizontal member 38 mounted on the chassis 10. Suitable cranks 39 are provided on the members 36 for rotating the same whereby the annular flanges 37 engage beneath the members 38 thereby causing the hold-down members 31 to move downwardly, whereupon the rod-like members 33 engage the downwardly sloping walls of the brackets 28 and 29 to lock the frame 11 to the vehicle 10.

My improved means for supporting the body 11 in raised position relative to the vehicle chassis 10 will now be described. Extending transversely across the channels 23 and 24 adjacent the forward end of the body 11 are tubular members 41 and 42 which are secured to the under framework of the body by any suitable means, such as by welding. In like manner, secured to the channels 23 and 24 adjacent the rear end of the body 11 are transverse tubular members 43 and 44. Telescoping slidably within the tubular members 41—42 and 43—44 are inner tubular members 46, 47, 48 and 49, respectively. As shown in Fig. 1, the tubular members 46 and 47 project outwardly in opposite directions whereby the outer ends thereof are positioned adjacent opposite corners at the forward end of the body 11. In like manner, the tubular members 48 and 49 project outwardly in opposite directions from each other whereby the outer ends thereof are positioned adjacent opposite corners at the rear end of the body 11.

Secured to the outer ends of each of the tubular members 46, 47, 48 and 49 is a vertically extending sleeve 51. Secured to each side of the sleeve 51 and to the adjacent end of each of the inner tubular members 46, 47, 48 and 49 are reinforcing plates 52 and 53. Secured to the inner ends of the plates 52 and 53, as by welding, and extending beneath the inner tubular members are short lengths of channel 54 which slidably engage the undersurface of the channel members 22 to prevent rotation of the inner tubular members. Mounted on the body 11 adjacent the ends of the channels 22 are suitable stop members 56 which engage the channel members 54 to limit outward movement of the inner tubular members, as shown in Figs. 1 and 4.

Mounted for vertical movement in the sleeves 51 are supporting leg members 57 which preferably are lengths of extra heavy tube or pipe. Each of the leg members 57 is provided with a bearing foot plate 58 at the lower end thereof. Aligned openings 59 are provided in the leg members 57 adjacent the top and bottom and intermediate the ends thereof which can be aligned with openings 61 provided in the sleeve members 51. Passing through the openings 61 in the sleeve members 51 and through selected ones of the openings 59 in the leg members 57 are pins 62 for locking the legs in either the raised or lowered position. By selecting the proper openings 59 in the leg members 57, the elevation at which the body is supported may be adjusted. As shown in Fig. 5, the pin 62 is held in place by a cotter pin 63. Preferably, the pin 62 and the cotter pin 63 are attached to suitable chains 64 and 66, respectively, which are connected to one of the reinforcing plates, as shown, to prevent loss of the pins.

In view of the fact that the counterbalance mechanism for each of the supporting legs 57 is identical in construction, a description of one will suffice for all. The outer walls 13 and 17 of the body 11 are provided with inset semi-circular dished portions 67 for receiving the innermost sides of the leg members 57, as shown in Figs. 6 and 7, when the leg members are moved to inoperative position. Attached to the upper end of the leg member 57 is a flexible member, such as a cable 68, which passes over sheaves 69 and 71 mounted for rotation on short shafts 72 and 73, respectively. The shafts 72 and 73 are supported between the side walls of the body 11, as shown in Figs. 4 and 7. A counterweight 74 is attached to the other end of the cable 68 as shown in Fig. 6 whereby the weight of the leg 57 is counterbalanced to permit easy raising and lowering thereof. Also, the upward pull on the leg 57 by the counterweight 74 causes pressure to be applied against the sleeve 51 thereby lifting the same slightly to permit the inner tubular member to slide freely within the outer fixed tubular member.

Mounted on the side walls 13 and 17 in position to encircle the upper ends of the leg members 57, when moved to the raised position, are U-shaped brackets 76 which hold the leg members against outward movement.

From the foregoing description, the operation of my improved means for supporting a removable vehicle body will be readily understood. To remove the chassis 10 from beneath the body 11, the body is raised to the desired elevation by suitable lifting mechanism associated with the chassis. The lifting mechanism is not shown in view of the fact that such mechanism is well known in the art and forms no material part of my present invention. With the body 11 raised the inner tubular members 46, 47, 48 and 49 are moved manually to the extended position, as shown in Figs. 1 and 4. The leg members 57 are then pulled down to the lowered position with the foot members 58 in engagement with the supporting surface indicated at S. The legs 57 are then locked in down position by inserting the pins 62 through the openings 59 and 61 in the legs and sleeves 51, respectively. The raising mechanism on the chassis is lowered, leaving the body supported on its legs. The vehicle is then free to be moved from beneath the body 11, as shown in Fig. 4.

To connect the vehicle chassis to the body 11, the vehicle is backed under the body to the position shown in Fig. 4 and the lifting mechanism, not shown, is employed to raise the body slightly whereby the pins 62 can be removed. The legs 57 are then moved to the uppermost position, shown in Figs. 6 and 7 with the upper ends thereof positioned inwardly of brackets 76. The pins 62 are then inserted in the openings 61 in the sleeve 51 and in the lowermost opening 59 of the leg members 57, thus locking the legs in raised position. The bracket 76 prevents outward movement of the leg members 57 thereby holding the same in a vertical position within the dished portions 67 until the pins 62 are removed. The guide members 26′ and 27′ assure proper alignment of the body on the chassis 10 as the body is lowered. With the body in lowered position, as shown in Fig. 2, the rod-like members 33 of the holddown 31 are positioned over the brackets 28 and 29 and the cranks 39 are turned thereby securing the body 11 to the chassis 10.

From the foregoing, it will be seen that I have devised improved means for supporting a removable vehicle body which is simple of construction and operation. By providing supporting leg members which are positioned a substantial distance outwardly of the sides of the vehicle chassis, the chassis may be readily backed beneath the body without the liability of coming in contact with the same. Also, by providing counterbalance means for the leg members 57, the legs may be readily raised and lowered with a minimum of effort and with complete safety to the operator. Furthermore, the upward force exerted by the counterweight permits free sliding movement of the inner tubular members relative to the fixed outer tubular members thereby facilitating lateral positioning of the leg members. In actual practice, I have found that my improved supports are satisfactory in every respect and may be readily applied to conventional type removable bodies. Due to the fact that the leg recesses in the side walls do not extend through the walls, the cargo space inside the body is not reduced.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A support for a removable vehicle body having hollow vertical walls comprising a guide member secured rigidly to the vehicle body, an outwardly and laterally extending member mounted for sliding movement along said guide member, a supporting leg mounted for vertical movement adjacent the outer end of said outwardly extending members, means detachably connecting said leg to said outwardly extending member in a lowered position of the leg, and means substantially counterbalancing the weight of said leg comprising a force exerting member located substantially within the confines of the body walls and operatively connected to said leg.

2. A support as defined in claim 1 in which the means substantially counterbalancing the weight of the leg comprises a sheave mounted on the vehicle body, a flexible member passing over said sheave and secured at one end to said leg, and a counterweight secured to the other end of said flexible member.

3. A support for a removable vehicle body having a hollow space in a vertical wall comprising a transversely directed tubular member secured rigidly to the vehicle body, a second tubular member telescoping slidably within the first mentioned tubular member, means limiting rotation of said second tubular member, a supporting bracket mounted adjacent the outer end of said second tubular member, a supporting leg mounted for vertical movement in said supporting bracket, means detachably connecting said leg to said bracket in a lowered position of the leg, and means counterbalancing the weight of said leg comprising a force exerting member located substantially in the hollow space of said wall and operatively connected to said leg.

4. A support for a removable vehicle body comprising a tubular member extending transversely beneath and secured to said body, a second tubular member telescoping slidably within the first mentioned tubular member and projecting outwardly of said body, a member extending transversely of said second tubular member and disposed to engage said body whereby rotation of said second tubular member is limited, a supporting leg mounted for vertical movement adjacent the outer end of said second tubular member, means detachably connecting said leg to said second tubular member at selected positions, a flexible member secured at one end to said leg, a sheave mounted on said body above said leg over which said flexible member passes, and a counterweight secured to the other end of said flexible member.

5. A supporting means for a removable vehicle body comprising guide members extending transversely beneath and secured to said body, support members mounted for sliding movement along said guide members and projecting outwardly of said body adjacent the corners thereof, leg members mounted for vertical movement adjacent the outer ends of said support members, means detachably connecting said leg members to said support members at selected positions, sheaves mounted on said body above and inwardly of said leg members, flexible members passing over said sheaves and connected at their outer ends to said leg members, and counterweights connected to the inner ends of said flexible members.

6. Supporting means for a removable vehicle body comprising pairs of transverse tubular members extending beneath and secured rigidly to said body, other tubular members telescoping slidably within said pairs of tubular members with said other tubular members of each pair projecting outwardly from opposite sides of said body, leg members mounted for vertical movement adjacent the outer ends of said other tubular members, means detachably connecting said leg members to said other tubular members at selected positions whereby the leg members may be locked selectively in raised or lowered position, sheaves mounted on said body above and inwardly of said leg members, cables passing over said sheaves and connected at their outer ends to said leg members, and counterweights connected to the other ends of said cables.

7. A support for a removable vehicle body comprising a tubular member extending transversely beneath and secured to said body, a second tubular member telescoping slidably within the first mentioned tubular member and projecting outwardly of said body, means limiting rotation of said second tubular member, a vertically extending sleeve mounted at the outer end of said second tubular member, a supporting leg mounted for vertical sliding movement in said sleeve, means detachably connecting said leg to said sleeve at selected positions, a sheave mounted on said body above said leg, a cable passing over said sheave and connected at one end to said leg, and a counterweight connected to the other end of said cable.

8. A support as defined in claim 7 in which the sleeve and the leg are provided with aligned openings, and a pin passing through the openings in the sleeve and leg to lock the leg in selected positions.

9. The combination with a detachable cargo body of the type having hollow vertical side walls, of pairs of tubular members secured to the underside of the body and extending transversely of the body, other tubular members telescopically and slidably connected to the first named tubular members and long enough to project outwardly past the vertical confines of the body when moved to outer position, vertically directed sleeves on the outer ends of said other tubular members, body supporting legs slidably mounted in said sleeves for movement to raised and lowered positions, there being vertical recesses in the walls of the body at least partially to receive the legs when in raised position, said recesses being of a depth relative to the thickness of said walls to extend only partially therethrough, means to secure the legs to the sleeves in lowered position of the legs, and means to hold the legs in raised position.

10. The combination set forth in claim 9 including means substantially counterbalancing the weight of said legs.

11. The combination set forth in claim 10 in which the counterbalancing means is a weight for each leg vertically slidable within the side walls and operatively connected to the adjacent leg.

References Cited in the file of this patent

UNITED STATES PATENTS

| | | |
|---|---|---|
| 1,857,611 | Swift | May 10, 1932 |
| 2,151,640 | Menning | Mar. 21, 1939 |
| 2,555,336 | Hagely | June 5, 1951 |
| 2,606,744 | Tracey | Aug. 12, 1952 |
| 2,665,938 | McCrossen | Jan. 12, 1954 |